United States Patent
Watkins et al.

(10) Patent No.: US 10,023,763 B2
(45) Date of Patent: Jul. 17, 2018

(54) SPRAYABLE POLYURETHANE COATING

(71) Applicant: Dow Global Technologies LLC, Midland, MI (US)

(72) Inventors: Avery L. Watkins, Pearland, TX (US); Mikhail Y. Gelfer, Sugarland, TX (US); Wei Li, Shanghai (CN); Yi Zhang, Shanghai (CN); Jiang Li, Shanghai (CN)

(73) Assignee: Dow Global Technologies LLC

( * ) Notice: Subject to any disclaimer, the term of this patent is extended or adjusted under 35 U.S.C. 154(b) by 0 days.

(21) Appl. No.: 15/502,384

(22) PCT Filed: Sep. 22, 2014

(86) PCT No.: PCT/CN2014/087081
§ 371 (c)(1),
(2) Date: Feb. 7, 2017

(87) PCT Pub. No.: WO2016/044973
PCT Pub. Date: Mar. 31, 2016

(65) Prior Publication Data
US 2017/0233604 A1  Aug. 17, 2017

(51) Int. Cl.
*C09D 175/04* (2006.01)
*B05D 1/02* (2006.01)

(52) U.S. Cl.
CPC ............ *C09D 175/04* (2013.01); *B05D 1/02* (2013.01)

(58) Field of Classification Search
None
See application file for complete search history.

(56) References Cited

U.S. PATENT DOCUMENTS

| | | |
|---|---|---|
| 3,437,366 A | 4/1969 | Korchmar et al. |
| 4,285,854 A | 8/1981 | Kageyama et al. |
| 5,739,184 A * | 4/1998 | Marbry .............. C08G 59/68 523/403 |
| 6,262,148 B1 * | 7/2001 | Cheng ................ C07C 215/50 523/458 |
| 6,642,343 B2 | 11/2003 | Gilles et al. |
| 7,812,101 B2 | 10/2010 | Fenn et al. |
| 8,261,930 B2 | 9/2012 | Satterfield et al. |
| 8,541,500 B2 | 9/2013 | Suau et al. |
| 2003/0176561 A1 | 9/2003 | Joshi et al. |
| 2007/0249778 A1 | 10/2007 | Clemens et al. |
| 2011/0098417 A1 | 4/2011 | Worley et al. |
| 2013/0001847 A1 | 1/2013 | Kato et al. |

FOREIGN PATENT DOCUMENTS

| | | | |
|---|---|---|---|
| CN | 103073689 A | | 5/2013 |
| WO | WO2009014842 | * | 1/2009 |

OTHER PUBLICATIONS

International Search Report and Written Opinion for PCT/CN2014/087081, dated Jun. 3, 2015, pp. 1-8.

* cited by examiner

*Primary Examiner* — Nathan T Leong

(57) ABSTRACT

Provided is a sprayable polyurethane coating, comprising the reaction product of an isocyanate component and an isocyanate-reactive component, wherein the isocyanate component includes an isocyanate, and the isocyanate-reactive component includes a cardanol-modified epoxy polyol. The cardanol-modified epoxy polyol is a reaction product of an epoxy component and an epoxy-reactive component at a ratio of epoxy groups to epoxy reactive groups from 1:0.95 to 1:5, and the epoxy-reactive component includes a cardanol component. A sprayable polyurethane based reaction system comprising the sprayable polyurethane coating and a process for forming the sprayable polyurethane coating are also provided.

11 Claims, No Drawings

SPRAYABLE POLYURETHANE COATING

FIELD

Embodiments relate to a sprayable polyurethane coating that is prepared using a cardanol modified polyol (which contains at least two hydroxyl groups and at least one moiety derived from cardanol) such as a cardanol-modified epoxy polyol, and the methods of manufacturing thereof.

INTRODUCTION

For protective coatings, epoxy systems and polyurethane systems have been proposed. However, conventional polyurethane based systems may be formed by reacting an isocyanate compound with a polyol compound, of which the polyol used may have at least one petroleum based building block (such as ethylene oxide and/or propylene oxide). While such petrochemical based polyols are widely used, these polyols face many problems such as exhaustion of natural resources and fluctuations in price based on changes in oil price. In the epoxy based art of aqueous dispersions and coatings, it has been suggested that petrochemical based resins may be substituted with a biomass based resin that is a reaction product of an epoxy resin and a biomass derived compound such as cardanol at a ratio of epoxy groups to epoxy reactive groups from 1:0.2 to 1:0.8, e.g., as discussed in U.S. Pat. No. 7,812,101. However, such a partially modified biomass based resin may not be suitable for use in the polyurethane art such as in sprayable polyurethane based system. With respect to alternatives to sprayable polyurethane based systems, epoxy (non-polyurethane) systems have been proposed. However, with epoxy systems there may be a high occurrence of failure, e.g., based on loss of tensile strength in highly acidic environments and/or based on brittleness/cracking due to low flexibility in highly acidic environments.

In view of the above, sprayable polyurethane based systems that combine the chemistries of both polyurethane systems and epoxy systems have been proposed.

SUMMARY

A sprayable polyurethane coating comprises the reaction product of an isocyanate component and an isocyanate-reactive component. The isocyanate component includes an isocyanate. The isocyanate-reactive component includes a cardanol-modified epoxy polyol, the cardanol modified epoxy polyol is a reaction product of an epoxy component and an epoxy-reactive component at a ratio of epoxy groups to epoxy reactive groups from 1:0.95 to 1:5, and the epoxy-reactive component including a cardanol component.

DETAILED DESCRIPTION

A sprayable polyurethane coating that combines epoxy and polyurethane chemistries has been proposed. For example, the sprayable polyurethane coating exhibits a synergy of a combination of properties such as a high mechanical strength, a high temperature performance, and/or a high anticorrosion performance. According to embodiments, the coating composition uses epoxy based chemistry to form a cardanol-modified epoxy polyol and uses polyurethane based chemistry by reacting the cardanol-modified epoxy polyol with a polyisocyanate. In particular, a sprayable polyurethane coating includes the reaction product of an isocyanate component that includes an isocyanate (e.g., one or more polyisocyanates may be included and/or one or more isocyanate-terminated prepolymers may be included) and an isocyanate-reactive component that includes a cardanol-modified epoxy polyol (e.g., one or more cardanol-modified epoxy polyols and/or one or more other polyols may be included, such as propylene oxide, ethylene oxide, and/or butylene oxide based polyols, and/or different natural oil derived polyols).

The cardanol-modified epoxy polyol is a reaction product of an epoxy component and an epoxy-reactive component at a ratio of epoxy groups to epoxy reactive groups from 1:0.95 to 1:5, the epoxy-reactive component including a cardanol component. With respect to the cardanol-modified epoxy polyol, the cardanol component may be a component in cashew nutshell liquid (CNSL), e.g., such that in the presence of a polyol derived from cardanol in the CNSL a cardanol modified polyol is formed. For example, the polyol derived from cardanol may improve the compatibility between the substrate to be coated and the coating itself. Variations are not limited thereto, e.g., a cardanol-modified polyol may be used. For example, a non-epoxy derived polyol such as cardanol derived Novolac polyol, e.g., as discussed in Publication No. WO 2011/003446 (which may be further alkoxylated to form a hydroxyl polyol) may be used. Another example of a cardanol-modified polyol is based on a Mannich reaction with formaldehyde and an ethanol amine to form a Mannich base that is also a polyol (which may be further alkoxylated to form a hydroxyl polyol).

The sprayable polyurethane coating, according to embodiments, may exhibit at least one of the following features:

(1) a sprayable and curable composition, such that the viscosity of composition is reduced enough to be sprayable while still being curable to form an effective protective coating.

(2) The epoxy derived cardanol-modified epoxy polyol may impart good mechanical performance and thermal resistance to the cured product, e.g., by forming a cross-linked network. By good mechanical performance it may be meant the result coating/layer, after submersion for one week in an acidic solution, has a retention in tensile strength that is that is greater than 100% and a retention in percent elongation that is greater than 5% (e.g., greater than 90% in exemplary embodiments). In exemplary embodiments, the retention in percent elongation may be low, but the initial tensile strength (e.g., greater than 4000 psi) and tensile strength after submersion (e.g., greater than 5500 psi) may be sufficiently high that the coating still provides significant advantages with respect to good mechanical performance.

Sprayable Polyurethane Coating

With respect to forming the sprayable polyurethane coating (e.g., thermoset and/or thermoplastic systems may be used), a sprayable polyurethane system includes polyurethane groups formed by the reaction of an isocyanate moiety (NCO) with an isocyanate reactive group such as a hydroxyl moiety (OH). The polyurethane systems include a mixture having the isocyanate component and the isocyanate-reactive component and/or the reaction product thereof in the form of an isocyanate-terminated prepolymer. The sprayable polyurethane system may be a pre-made reaction product incorporated into a composition for forming a coating such that the individual components that form the polyurethane system may be incorporated into a composition for forming the coating right before spraying the components, during spraying of the components, after one component is sprayed and during spraying of another component, and/or a combination thereof.

For example, the isocyanate component may be at least partially (or entirely) pre-reacted with the isocyanate-reactive component to be in the form of an isocyanate-terminated prepolymer, which prepolymer is then sprayed onto a surface (such as a large container) to form a protective coating so as to have a prepolymer based one-component system for forming the coating. When the prepolymer is used, an additional amount of separate polyol may be directly added to the composition for forming the coating so as to have a prepolymer based two-component system for forming the coating. When the prepolymer is not used, the isocyanate component and the isocyanate-reactive component of the polyurethane resin system may be directly mixed to form the coating as a reaction product thereof so as to have a two-component system for forming the coating. In exemplary embodiments, a prepolymer based two-component system is used to form a sprayable protective coating, in which the isocyanate component is a pre-made isocyanate-terminated prepolymer that is then reacted with the isocyanate-reactive component that includes the cardanol-modified epoxy polyol.

With respect to forming the sprayable polyurethane coating, the isocyanate component includes a polyisocyanate (e.g., at least one polyisocyanate) and/or an isocyanate-terminated prepolymer derived from at least one polyisocyanate (e.g., at least one isocyanate-terminated polyurethane based prepolymer). Exemplary polyisocyanates include diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'-, and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE. According to an exemplary embodiment, the at least one isocyanate has an average functionality of from 2.8 to 3.2 (e.g., 2.2 to 2.9, etc.) and a free isocyanate group content (i.e., NCO content) of from 25 wt % to 35 wt % (e.g., 30 wt % to 32 wt %).

With respect to forming the sprayable polyurethane system for forming a coating, the isocyanate-reactive component includes at least one cardanol-modified polyol (which contains at least two hydroxyl groups and at least one moiety derived from cardanol and/or CNSL), which according to embodiments is a cardanol-modified epoxy (CME) polyol. The CME polyol may be formed by reacting a cardanol containing component (such as CNSL) with an epoxy component. The CME polyol may account for 5 wt % to 75 wt % (e.g., 20 wt % to 60 wt %, 30 wt % to 55 wt %, 35 wt % to 65 wt %, 35 wt % to 50 wt %, etc.) based on the total weight of a composition for forming the sprayable polyurethane coating. For example, when the coating is formed using a prepolymer based one-component system, the CME polyol may account for 5 wt % to 75 wt % (e.g., 30 wt % to 75 wt %, 55 wt % to 70 wt %, 60 wt % to 65 wt %, etc.) of the total weight of the one-component system. When the coating is formed using a prepolymer based two-component system, the CME polyol may account for 5 wt % to 75 wt % (e.g., 20 wt % to 65 wt %, 25 wt % to 55 wt %, 35 wt % to 50 wt %, 40 wt % to 45 wt %, etc.) of the total weight of the isocyanate-reactive component of the two component system. The CME polyol may be included in an isocyanate-reactive component for forming the prepolymer.

The isocyanate-reactive component for forming the sprayable polyurethane coating (or forming the prepolymer) may optionally include additional polyols (or optionally an amines), such as a polyether or polyester polyol. For example, the additional polyol may be a low viscosity polyol to counterbalance the relatively higher viscosity of the CME polyol. If included, at least one of the additional polyol and/or amine may be added at a same time as the CME polyol or a different time. For example, when a prepolymer is used in the system for forming the sprayable polyurethane coating, the at least one additional polyol may be included in the polyol component for forming the prepolymer (in addition to the CME polyol) or separately added to the sprayable composition for forming the coating. When the prepolymer is not used, the at least one additional polyol may be mixed with the components of the sprayable composition at the same time as the CME polyol or the use of additional polyols may be avoid. The at least one other polyol may have a petroleum based building block (e.g., propylene oxide, ethylene oxide, and/or butylene oxide) or a natural oil derived building block.

According to exemplary embodiments, a propylene oxide-glycerine based polyol, a poly(tetramethylene ether) glycol based polyol, a polypropylene glycol based polyol, and/or a polybutadiene based polyol may be used in the isocyanate-reactive component. Another exemplary polyol has a polyoxybutylene content of at least 50 wt % (e.g., a butylene oxide—propylene oxide polyol). For example, a propylene oxide based polyether (such as one available under the tradename VORANOL™ from The Dow Chemical Company), a natural oil derived polyol (such as castor oil), and/or a hydrophobic polyol such as one available under the tradename VORAPEL™ from The Dow Chemical Company may be used in the isocyanate-reactive component and/or in the isocyanate component to form a prepolymer.

For example, when the hydrophobic polyol is used to form a prepolymer (as part of a two-component system), the hydrophobic polyol may account for 20 wt % to 65 wt % (e.g., 25 wt % to 60 wt %, 30 wt % to 55 wt %, 35 wt % to 50 wt %, 40 wt % to 45 wt %, etc.) of the total weight of the composition for forming the prepolymer. The hydrophobic polyol may be included in the isocyanate-reactive component (such as blended with the CME polyol), in an amount from 1 wt % to 45 wt % (e.g., 5 wt % to 40 wt %, 10 wt % to 35 wt %, 20 wt % to 35 wt %, 25 wt % to 30 wt %, etc.). The hydrophobic polyol may have a number average molecular weight from 500 g/mol to 3,000 g/mol (e.g., 1,000 g/mol to 2,500 g/mol, 1,500 g/mol to 2,000 g/mol, etc.). The hydrophobic polyol may have a viscosity that is less than 600 cP at 25° C. (e.g., less than 550 cP at 25° C. and/or less than 500 cP at 25° C.). For example, the viscosity of the hydrophobic polyol may be from 200 cP at 25° C. to 550 cP at 25° C. (e.g., 300 cP at 25° C. to 500 cP at 25° C., 400 cP at 25° C. to 500 cP at 25° C., 450 cP at 25° C. to 500 cP at 25° C., etc.). The hydrophobic polyol may be a diol or a triol.

In an exemplary embodiment that uses a two-component system for forming a coating, a relatively lower viscosity hydrophobic polyol is used to form an isocyanate-terminated prepolymer in the first component and the relatively higher viscosity CME polyol is used in the second component (along with other additives such as a curing agent and/or catalyst). In an exemplary embodiment that uses a one-component system for forming a coating, both the relatively lower viscosity hydrophobic polyol and the relatively higher viscosity CME polyol may be used to form an isocyanate-terminated prepolymer.

For sprayable polyurethane systems the isocyanate-reactive component and the isocyanate component may be added at an isocyanate index from 60 to 300 (e.g., 60 to 120, 80 to 150, 90 to 120, 100 to 115, etc.). This may be the isocyanate index used to form the prepolymer of the isocyanate component, to form the reaction product of the isocyanate component and the isocyanate-reactive component, and/or both. The isocyanate index is measured as the equivalents of isocyanate in the reaction mixture for forming the polyurethane resin, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage. When used in prepolymer form, the resultant reaction product may have an NCO (i.e., isocyanate moiety) content from 2 wt % to 23 wt % (e.g., 3 wt % to 15 wt %, 4 wt % to 8 wt %, 4 wt % to 6.5 wt %, etc.). The isocyanate index may be from 90 to 300 (e.g., 150 to 250, 175 to 200, etc.)

The isocyanate component and/or the isocyanate-reactive component may include an additive component, which includes an additive such a curative agent, a catalyst, a surfactant, a plasticizer, a filler, a solvent, a hardener, a chain extender, a crosslinker, and/or additives known in the art for use in sprayable polyurethane or epoxy coatings.

Based on the viscosity of the sprayable polyurethane system a solvent (e.g., toluene) may be added as part of the additive component. The solvent may be a low vapor pressure solvent that will evaporate in the curing process and/or will essentially not influence or may improve the mechanical properties of the final cured composition. For example, for the relatively lower viscosity systems, no solvent is added into the composition. According to exemplary embodiments, the coating is made using a sprayable polyurethane system that includes the CME polyol and excludes any solvents.

Exemplary catalysts include catalysts include tertiary amines, Mannich bases formed from secondary amines, nitrogen-containing bases, alkali metal hydroxides, alkali phenolates, alkali metal alcoholates, hexahydrothiazines, and organometallic compounds. The catalyst may be added, in amount from 0.001 wt % to 10 wt %, based on the total weight of the sprayable polyurethane system. The catalyst may accelerate the curing time of isocyanate moieties (maybe in the isocyanate component or in prepolymers) and active hydrogens (maybe polyols and/or chain extenders) to offer mechanical properties. Dyes and/or pigments (such as titanium dioxide and/or carbon black), may be included in the additive component to impart color properties to the polyurethane coatings. Pigments may be in the form of solids or a dispersion in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane coating.

The sprayable polyurethane system may be a curable composition that includes curing agent/hardener component in addition to the polyurethane system or as part of the polyurethane system. The amount of the hardener component used may vary depending on whether the hardener component is used in addition to or as part of the polyurethane system. In exemplary embodiments, an amine based hardener (e.g., one that is known in the art for use in curing epoxy systems) may be excluded because the sprayable polyurethane systems rely on urethane curing chemistry due to minimal residual epoxy content.

When forming the polyurethane coating, a process for curing the composition (e.g., a process known in the art) may be used to form a thermoset or cured composition. For example, the composition or formulation may be cured under conventional processing conditions to form a film, a coating, or a solid. Curing the curable composition may be carried out at curing reaction conditions including a predetermined temperature and for a predetermined period of time sufficient to cure the composition. The curing conditions may be dependent on the various components used in the curable composition such as the hardener used in the formulation. The curing reaction conditions include, e.g., carrying out the reaction under a temperature, generally in the range of from −5° C. to 60° C. (e.g., 0° C. to 50° C., 5° C. to 25° C., etc.). For sprayable applications, the coating may be applied to substrates, e.g., using airless sprayers and air-assisted pneumatic sprayers and the like. The applied composition may be cured by heating the composition at the aforementioned curing temperatures.

Formation of CME Polyol

The CME polyol is a reaction product of a mixture that includes an epoxy component and an epoxy-reactive component. The epoxy-reactive component includes a cardanol component (and may include an optional phenol or phenol derivative component). The epoxy-reactive component includes phenols with hydrogen atoms that are reactive with epoxy groups in the epoxy component. The epoxy-reactive component may include at least 50 wt % (e.g., at least 60 wt %, at least 70 wt %, at least 80 wt %, at least 90 wt %, and/or 100 wt %) of the cardanol component, based on a total weight of the epoxy-reactive component. A remainder of the epoxy-reactive component may be the phenol or phenol derivative component and/or the additive component. The epoxy component and/or the epoxy-reactive component may include the additive component (e.g., that may include an additive such as a curative agent, a catalyst, a surfactant, a plasticizer, a filler, a solvent, a chain extender, and/or a crosslinker). A ratio of epoxy groups in the epoxy component to the epoxy reactive groups in the epoxy-reactive component may be from 1:0.95 to 1:5 (e.g., 1:0.95 to 1:4, 1:0.95 to 1:3, 1:0.95 to 1:2, 1:0.95 to 1:1.5, etc.). According to exemplary embodiments, an excess of the epoxy-reactive component may be used, e.g., the ratio may be from 1:1.01 to 1:5, 1:1.05 to 1:3, 1:1.5 to 1:2.5, 1:2 to 1:3, etc.).

The epoxy component for forming the CME polyol includes at least one epoxy resin. The at least one epoxy resin may account for 90 wt % to 100 wt % of the epoxy component, with any remainder optionally being a portion or an entirety of the additive component. The amount of epoxy resin may be in the range of from 0 wt % to about 95 wt % based on the total weight of the sprayable polyurethane system (e.g., from 10 wt % to 75 wt %, from 20 wt % to 50 wt %, etc.). According to embodiments, the sprayable polyurethane system includes epoxy resin compounds that are reacted with a CNSL moiety. For example, such epoxy resin compounds may include an epoxidized CNSL, an epoxy resin modified CNSL, a reaction product of epoxy resin and CNSL, and mixtures thereof. For example, the epoxy resin compound may be a CNSL-modified epoxy resin. A CNSL-modified epoxy resin includes the reaction product of (i) an epoxy resin and (ii) CNSL such as the cardanol component in CNSL. The epoxy resin, component (i) used to prepare the CNSL-modified epoxy resin can be, e.g., one or more of the same aforementioned epoxy resins without a cashew nutshell liquid moiety.

The epoxy component may include a wide variety of epoxy compounds. Any epoxy compound that improves the mechanical and thermal performance of the composition may be used. For example, the epoxy compounds or polyepoxides may be aliphatic, cycloaliphatic, aromatic, heterocyclic and mixtures thereof. Epoxy resins useful in the embodiments described herein may include, e.g., monofunctional epoxy resins, multi- or poly-functional epoxy resins, and combinations thereof. Exemplary epoxy resins for the epoxy component include polyepoxides that have at least two epoxide moieties per molecule (e.g., the epoxy resin may have a 2 to 10 epoxide functionality, a 2 to 6 epoxide functionality, a 2 to 4 epoxide functionality, etc.). The epoxy resin backbone may be saturated or unsaturated, aliphatic, cycloaliphatic, aromatic, or heterocyclic and may be substituted (e.g., contain at least one substituent such as halogen, hydroxyl, and/or ether groups). The epoxy resin may be monomeric or polymeric. The epoxy resin may have an equivalent epoxy weight (EEW) from 20 g/eq to 1000 g/eq (e.g., 30 g/eq to 800 g/eq, 50 g/eq to 600 g/eq, 100 g/eq to 500 g/eq, etc.), which EEW is the measure of the number of grams of resin for one chemical equivalent of an epoxy group.

According to exemplary embodiments, a raw material liquid epoxy resin that is from 60 wt % to 95 wt % (e.g., 70 wt % to 90 wt %, etc.) based on the total weight of the epoxy resin, of a diglycidylether of bisphenol, such as Bisphenol A and Bisphenol F, may be used. The epoxy equivalent weight (EEW) of the raw material liquid epoxy resin may be from 150-250 (e.g., 160-220, 170-200, etc.). As used herein, the term "liquid epoxy resin" refers to the resin in a liquid state without adding any solvent. Exemplary epoxy resins include bisphenol A diglycidyl ether, bisphenol F diglycidyl ether, resorcinol diglycidyl ether, and triglycidyl ethers of para-aminophenols. The epoxy resin compound containing a CNSL moiety can be, e.g., a CNSL glycidyl ether. The CNSL glycidyl ether compound can be one or more of the compounds prepared and described in Kanehashi, S., et al., Preparation and Characterization of Cardanol-based Epoxy Resin for Coating at Room Temperature Curing, Journal of Applied Polymer Science, 2013. 130(4): p. 2468-2478. Some of the CNSL glycidyl ether compounds described in the reference above include, e.g., monoglycidyl ether of cardanol, diglycidyl ether of cardol, or mixtures thereof.

An exemplary raw material liquid epoxy resin has the Formula (I) below,

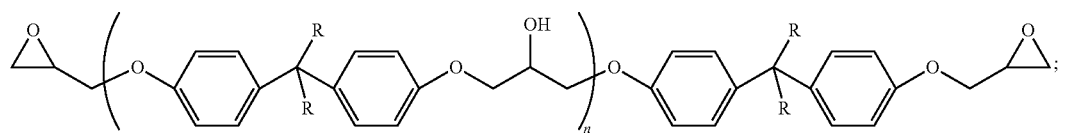

wherein n is 0 or 1 (in an exemplary embodiment n is 0). The average n value of the liquid epoxy resin (I) is from 0 to 1 (e.g., 0 to 0.5, 0 to 0.3, etc.). R is independently H or —$CH_3$.

The epoxy resin component may include an epoxy resin that is commercially available, e.g., from The Dow Chemical Company under the tradenames D.E.R. and D.E.N. Examples of epoxy resin includes, but are not limited to, D.E.R.™ 331, which is a commercial product of The Dow Chemical Company, D.E.R.™ 354 of The Dow Chemical Company, D.E.R.™ 332 of The Dow Chemical Company, D.E.R.™ 330 of The Dow Chemical Company, and D.E.R.™ 383 of The Dow Chemical Company. Exemplary commercially available epoxy resins that may be used include DER™ 331, DER™ 383, DER™ 671, DER™ 736, DER™ 852, and DEN™ 438, which are available from The Dow Chemical Company. The viscosity and cost of the resultant CME polyol may be controlled by the choice of the epoxy resin used in the epoxy component.

The cardanol component in the epoxy-reactive component for forming the CME polyol includes a cardanol component (e.g., CNSL) that may be a by-product of cashew nut processing (e.g., may be extracted from a layer between a nut and a shell of a cashew nut). Cardanol is a monohydroxyl phenol having a long hydrocarbon chain in the meta position. The cardanol useful in embodiments is one component of CNSL, an oil isolated from the shell of the cashew nut.

The concentration of cardanol in the CNSL may be, based on the total weight of the CNSL, about 10 wt %, about 50 wt %, or about 90 wt %; and at the same time, about 99 wt % or less, about 97 wt % or less, or about 95 wt % or less. For example, the cardanol component has a cardanol content of at least 50 wt % (e.g., from 60 wt % to 100 wt %, from 85 wt % to 100 wt %, etc.), based on a total weight of the second cardanol component. An exemplary structure of cardanol is a phenol containing one hydroxyl group, and an aliphatic side chain $R_1$ in the meta-position, as shown in the Formula (II) below,

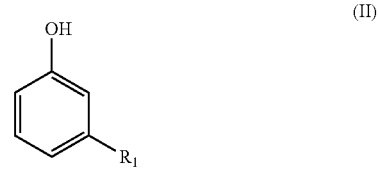

wherein, $R_1$ is —$C_{15}H_{25}$, —$C_{15}H_{27}$, or —$C_{15}H_{29}$.

The cardanol component includes cardanol as a primary component and may additionally include cardol, methylcardol, and/or anacardic acid as secondary components. The cardanol component may be subjected to a heating process (e.g., at the time of extraction from the cashew nut), a decarboxylation process, and/or a distillation process. Cardol can be illustrated, for example, by the following general chemical formula:

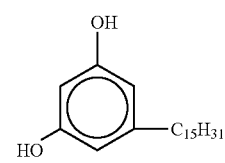

Cardol

The concentration of cardol in the CNSL may be, based on the total weight of the CNSL, about 0.1 wt % or more, about 1 wt % or more, or about 5 wt % or more; and at the same time, about 90 wt % or less, about 50 wt % or less, or about 10 wt % or less. Further, the CNSL may include minor concentrations of other materials such as anacardic acid, oligomers of cardanol, oligomers of cardol, and mixtures thereof. The total concentration of the other materials present in the CNSL is may be less than about 10 wt %.

According to exemplary embodiments, the cardanol component may include from 20 wt % to 50 wt % (e.g., from 20 wt % to 45 wt %, from 20 wt % to 40 wt %, 30 wt % to 40 wt %, etc.) of cardol, with a remainder based on a total of 100 wt % of the cardanol component being methylcardol and/or anacardic acid. The cashew nutshell liquid of the cardanol component is available, e.g., from HDSG Beijing Technology under the tradename F-120 series or F-180 series. Without intending to be bound by this theory, the first cardanol component may increase hydrophobicity, reduce viscosity, increase gel time of the polyurethane system, and/or provide tensile strength. With respect to gel time, a balance may be realized between the need for a quick cure time to form the coating, the need for adequate flowability of the components during the process of spraying the components that form the coating, and the need to reduce and/or prevent excessive wasteful flow of the components. Gel time (i.e., string gel time) is determined as the interval between the time that the reactive components are first mixed to form a reacting liquid mixture until the reacting liquid mixture becomes stringy (i.e., the material has built enough molecular weight to transition from a liquid to a solid). In particular, the determination of stringing may be include repeatedly touching the reaction mixture with a stick and pulling the stick away from the liquid and stringing occurs when the material in the reaction mixture has polymerized to the point that a single or multiple filaments remain on the end of the stick.

The epoxy-reactive component may include at least 50 wt % (e.g., at least 60 wt %, at least 70 wt %, at least 80 wt %, at least 90 wt %, and/or 100 wt %) of the cashew nutshell liquid, based on a total weight of the epoxy-reactive component. A remainder of the epoxy-reactive component may be an optional phenol or phenol derivative component and/or the additive component (e.g., that includes at least one catalyst and/or at least one solvent).

The optional phenol or phenol derivative component includes at least one phenol and/or at least one phenol derivative. The reaction mixture may include the optional phenol or phenol derivative component at a molar ratio from 0.5:1.5 to 1.5:0.5 (e.g., 0.8:1.2 to 1.2:0.8, 0.9:1.1 to 1.1:0.9, etc.) for the moles of the phenol or phenol derivative to the moles of the cardanol component in the reaction mixture. For example, the molar amount of the cardanol component used may be reduced based on the molar amount of the phenol or phenol derivative used. Exemplary phenol derivatives include a naphthol based compound, a phenylphenol based compound, and a hexachlorophene based compound.

For example, the epoxy-reactive component may include from 0.1 wt % to 20 wt % (0.1 wt % to 15 wt %), based on the total weight of the epoxy-reactive component, of another phenol based compound such as a dihydric phenol. The term dihydric phenol refers to a phenolic compound containing 2 hydroxyl groups. According to exemplary embodiments, dihydric phenol refers to either of (A) a phenol with two hydroxyl groups on one benzene ring in the Formula (III), wherein $R_2$ is H or a $C_1$-$C_{15}$ aliphatic chain; or (B) a composition containing two benzene ring each with one hydroxyl group on it in the Formula (IV), wherein R is H or —$CH_3$; and $R_3$ to $R_{10}$ is H or a $C_1$-$C_6$ aliphatic chain.

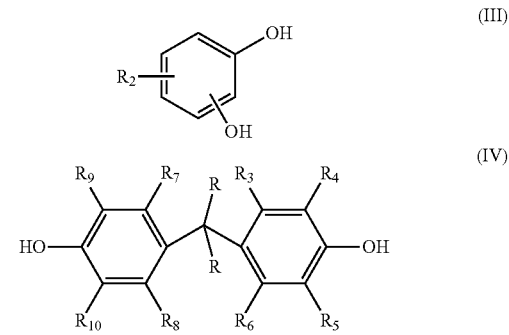

Another example of a phenol containing two hydroxyl groups is resorcinol.

Exemplary catalysts for forming the CME polyol include tertiary amines, Mannich bases formed from secondary amines, nitrogen-containing bases, alkali metal hydroxides, metal alkoxides, alkali phenolates, alkali metal alcoholates, hexahydrothiazines, organometallic compounds, quaternary ammonium compounds, phosphonium compounds, and sulfonium compounds. For exemplary, the catalyst component may include NaOH, KOH, ethyl triphenyl phosphonium acetate, imidazole, and/or triethylamine. The catalyst component may be present in an amount from 0.01 wt % to 3 wt % (e.g., 0.03 wt % to 1.5 wt %, 0.05 wt % to 1.5 wt %, etc.) based upon the total weight of the reaction mixture for forming the CME polyol. The reaction between the epoxy component and the epoxy-reactive component may be carried out neat or in the presence of an inert organic solvent. Exemplary solvents include ketone (such as methyl isobutyl ketone and/or methyl amyl ketone), toluene, xylene, and glycol ethers (such as the dimethyl ether of diethylene glycol). Fillers such as inorganic and/or organic fillers, coloring agents, water-binding agents, surface-active substances, plant protection agents, extenders and/or plasticizers may be included in the additive component. The reaction for forming the CME polyol may be conducted at a temperature of 120° C. to 180° C., e.g., for 1 hour to 48 hours.

The CME polyol includes an epoxy derived backbone and at least two secondary isocyanate reactive groups, i.e., secondary hydroxyl groups, for reaction with isocyanate groups in the isocyanate component. The CME polyol may allow for adjustment of curing time, e.g., based on the slower reactivity of secondary isocyanate reactive groups relate to primary isocyanate reactive groups. The epoxy backbone may act as a building block and determine the functionality number and chemical structure of the resultant CME polyol. Synthesis of the CME polyol includes a reaction between cardanol in the second cardanol component and an opened epoxy resin produced from a ring-opening reaction of the epoxy resin in the epoxy component. For example, the CME polyol includes a cardanol linkage with the ring opened epoxy resin, which results in an ether bond between the opened epoxy resin and the cardanol. The time required to complete the modification reaction depends upon the factors such as the temperature employed, the chemical structure of the compound having more than one reactive hydrogen atom per molecule employed, and the chemical structure of the epoxy resin employed.

According to exemplary embodiments, the CME polyol may include a compound having the following Formula V when synthesis is carried out using an epoxy resin, which has two epoxide moieties and a resin backbone, and the second cardanol component, which has therein at least mono-unsaturated cardanol:

Formula V

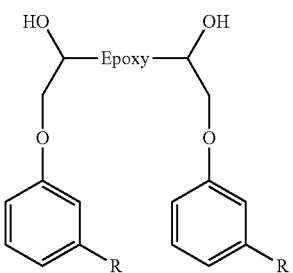

In the above Formula 1, the R groups are independently equal to $C_{15}H_{31-n}$ (in which n=0, 2, 4, or 6) or $C_{17}H_{33-n}$ (in which n=0, 2, or 4). In particular, the R group is independently a saturated or unsaturated straight alkyl chain that includes fifteen or seventeen carbon atoms, and the CME polyol may be derived from a cardanol mixture that variously includes cardanols having different R groups. The Epoxy in Formula V is the epoxy resin derived backbone.

According to an exemplary embodiment, the synthesis of a CME polyol using a bisphenol A based diepoxide resin and the second cardanol component that has therein at least mono-unsaturated cardanol, includes the following reaction stage:

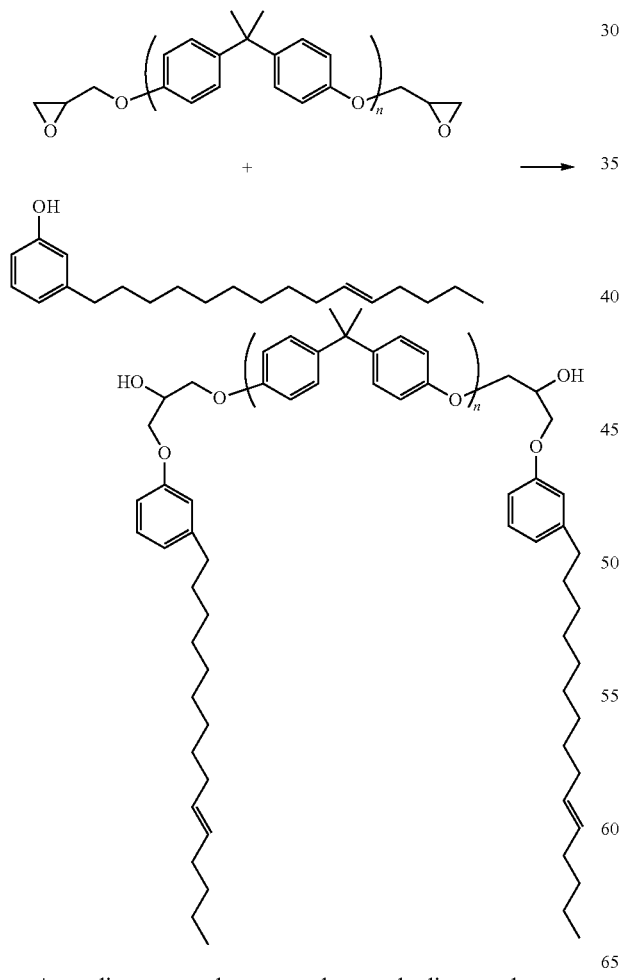

According to another exemplary embodiment, the synthesis of a CME polyol using an aliphatic diepoxide epoxy resin and the second cardanol component that has therein at least mono-unsaturated cardanol, includes the following reaction stage:

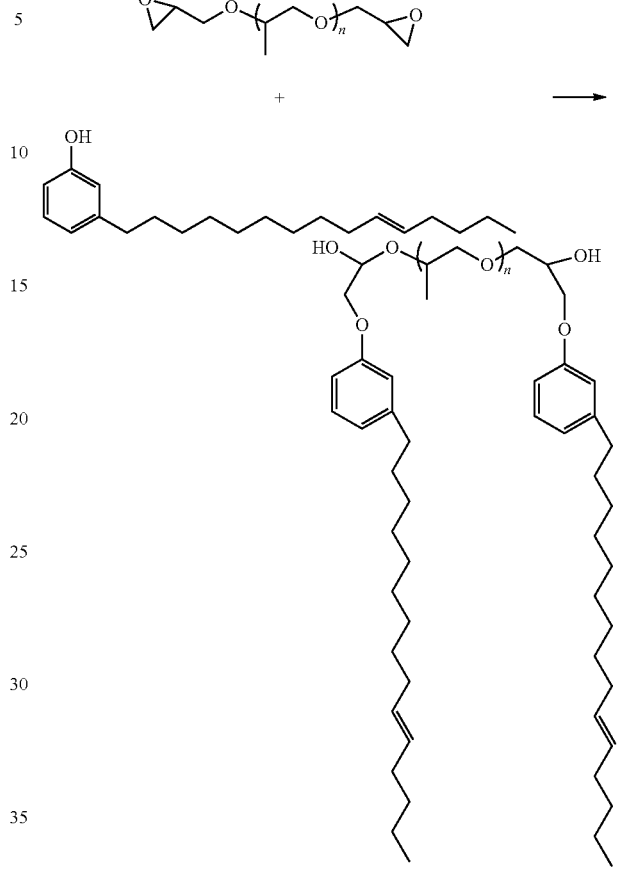

Other exemplary CME polyol structures that are synthesized using various aromatic epoxy resins and the second cardanol component include the following:

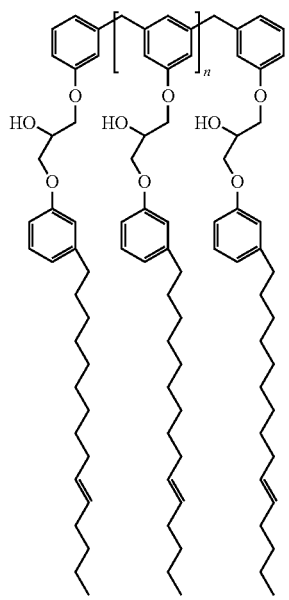

First CME Polyol

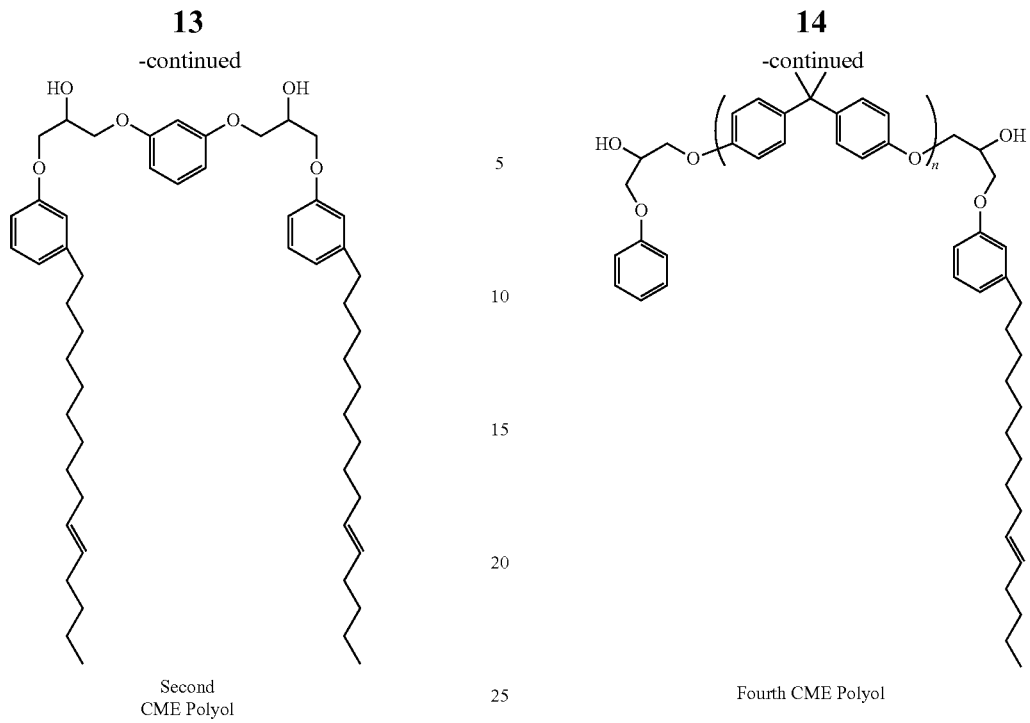

Second CME Polyol

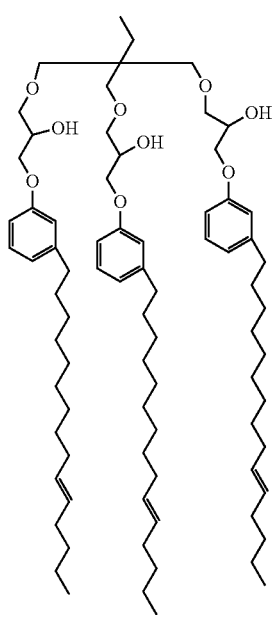

Third CME Polyol

Fourth CME Polyol

The First CME Polyol, above, is synthesized using an aromatic polyepoxide based resin and mono-unsaturated cardanol. The Second CME Polyol, above, is synthesized using a phenyl diepoxide resin and mono-unsaturated cardanol. The Third CME Polyol, above, is synthesized using an aliphatic polyepoxide based resin and mono-unsaturated cardanol. The Fourth CME Polyol, above, is synthesized using a bisphenol A based diepoxide resin, phenol, and mono-unsaturated cardanol.

Without intending to be bound by this theory, the cardanol in the CME polyol may introduce hydrophobicity into the resultant polyurethane resin. The increased hydrophobicity may be expressed as a low water absorbance in humid conditions, e.g., a low water absorbency. Further, hydrolysis and bubbling (e.g., the effect of bubbles being generated by carbon dioxide release from a reaction between water and an isocyanate component in the reaction mixture), may be reduced and/or avoided. The epoxy resin derived backbone of the CME polyol may provide property improvements such as mechanical performance and material compatibility to the polyurethane resin. Mechanical performance and/or other desired properties of the CME polyol may be adjusted in view of the alkyl chain moiety on the cardanol in the cardanol component. Phenol or phenol derivatives added into the reaction mixture for forming the CME polyol may initialize the epoxy group ring-opening reaction, while the cardanol component may offer hydrophobicity characteristics and anti-hydrolysis performance.

In the reaction mixture for forming the CME polyol, the ratio of epoxy groups in the epoxy component to the epoxy reactive groups in the epoxy-reactive component is from 1:0.95 to 1:5 (e.g., 1:0.98 to 1:4, 1:0.99 to 1:3, 1:1 to 1:2.5, 1:1 to 1:1.1, etc.). For example, the excess of epoxy reactive groups provided from the cardanol component may enable sufficient conversion of the epoxy resin to the CME polyol and/or provide low viscosity to the reaction mixture (which low viscosity also enables sufficient conversion). An epoxy residue left in the resultant reaction product of the reaction mixture for forming the CME polyol, may be less than 0.2 wt %, based on a total weight of the resultant reaction product. For example, an epoxide equivalent weight of the resultant reaction product may be at least 8,000 grams/equivalent (e.g., from 9,000 g/eq to 100,000 g/eq, from 20,000 g/eq to 100,000 g/eq, from 30,000 g/eq to 100,000 g/eq, etc.), as measured according to ASTM D1652. A hydroxyl value of the resultant reaction mixture may be at least 40 mg KOH/g (e.g., from 40 mg KOH/g to 300 mg KOH/g, 60 mg KOH/g to 200 mg KOH/g, 80 mg KOH/g to 100 mg KOH/g, etc.), as measured according to ASTM D4274. The hydroxyl value may account for the CME polyol and unreacted hydroxyl groups in the epoxy-reactive component.

According to an exemplary embodiment, full conversion (i.e., a conversion rate of at least 93%) of the epoxy groups in the reaction mixture for forming the CME polyol to hydroxyl groups may be realized. According to exemplary embodiments, the reaction mixture that forms the CME polyol may have a conversion rate of 95% of the epoxy groups to hydroxyl groups and an EEW of at least 9,000 g/eq or a conversion rate of 98.5% of the epoxy groups to hydroxyl groups and an EEW of at least 30,000 g/eq. For example, full conversion may be demonstrated by gel permeation chromatography (GPC) spectra characterization, which may indicate that the lower molecular weight epoxy component has essentially reacted out resulting in full conversion to the higher molecular weight CME polyol. Full conversion may be demonstrated by Fourier transform infrared (FTIR) spectrometry, which may indicate that the infrared pattern corresponding to the epoxy component is essentially not present or is present in a negligible amount in the infrared pattern corresponding to the CME polyol. Full conversion may be demonstrated by nuclear magnetic resonance spectrometry, which may indicate that the magnetic properties pattern corresponding to the epoxy component is essentially not present or is present in a negligible amount in the magnetic properties pattern corresponding to the CME polyol.

Protective Coatings for Large Industrial Containers

The sprayable polyurethane coating may be used as protective coatings for large industrial containers (e.g., industrial containers that hold more than 10,000 gallons), which are often used to hold abrasive and/or corrosive materials, as such the containers are lined with a protective coating. For example, large industrial containers such as frac tanks are used in the oil and gas industry to store and transport hydraulic fracturing fluids to and from well sites. Since the hydraulic fracturing fluid may include corrosive materials such as hydrochloric acid and toxic solvents such as toluene and xylene, to reduce and/or minimize the possibility of leakage the frac tank (e.g., the interior) is lined with the protective coating. Due to the large surface area of the containers, protective coatings that both are sprayable onto large surface areas and impart chemical resistance are sought for use on surfaces of the large industrial containers.

Hydrochloric acid is commonly used in applications such as mining, refining, cleaning of metal products, electroplating and oil and gas recovery. However, due to its corrosive nature storing and transporting HCl presents a significant challenge to end users. When steel tanks and vessels (such as rail cars) are used to store HCl, they are typically coated with a elastomeric rubber lining to protect against corrosion. However, these rubber linings are expensive and require the constant presence of acid to prevent the rubber from drying and becoming brittle. Further, spray applied epoxy resins can be used to protect against corrosion, but these coating may be difficult to apply to cold surfaces and form brittle, crack-prone coatings when cured. Polyurethane and polyurea coatings, unlike epoxy coatings, can be applied in extremely low temperatures and form tough and flexible coatings, but polyurethane based coatings may fail to yield resistance to concentrations of HCL which exceed 28% based on volume.

The protective coating is both formed by using spray equipment and exhibits chemical resistance in abrasive and/or corrosive environments. The protective coating may be applied via plural component high pressure spray machines onto a surface of a large industrial container such as a frac tank. The plural component equipment may combine and/or mix the isocyanate component and the isocyanate-reactive component, e.g., under high pressure such as 1000 psi to 3000 psi. The components may also be heated, e.g., within the spray equipment, to an application temperature within the range of 60° C. and 80° C. Each component that is sprayed from the spray equipment, may have viscosity of less than 1500 cP at 25° C. (e.g., without adding any solvents and/or diluents).

All percentages are by weight, unless indicated otherwise. All values for molecular weight are based on number average molecular weight, unless indicated otherwise.

EXAMPLES

Formation of CME Polyol

The following materials are used:

D.E.R.™ 383 An aromatic epoxy resin that is a reaction product of epichlorohydrin and bisphenol A, having an epoxide equivalent weight of approximately 183 g/eq (available from The Dow Chemical Company).

CNSL A A cashew nutshell liquid that includes 94 wt % of cardonal (available as CNSL S9405 from Hua Da Sai Gao [i.e., HDSG of Beijing] Technology).

A CME Polyol is prepared by mixing D.E.R.™ 383 and CNSL A. In particular, approximately 182 grams of D.E.R.™ 383 and approximately 330 grams of CNSL A are added to a 4-necked round bottom flask (equipped with a thermometer, a mechanical stirrer, and a nitrogen connection) to form a reaction mixture for forming the CME Polyol. In the reaction mixture, a ratio of epoxy groups in the D.E.R™ 383 to epoxy reactive hydroxyl groups in the CNSL A is approximately 1:1.05. Then, the flask is thoroughly purged and protected with nitrogen for 10 minutes. Next, agitation of the reaction mixture within the flask is started at room temperature (i.e., within the approximately range of 20° C. to 23.5° C.) and approximately 0.26 grams of Catalyst A is added into the reaction mixture, during which time period agitation is continued and heat is applied to the reaction mixture. Once a temperature of 160° C. is reached, that temperature is maintained for four hours. Thereafter, nitrogen protection is continued until the reaction mixture for forming the CME Polyol has cooled to 40° C. The resultant CME Polyol has an equivalent weight of approximately 490 g/mol equivalent and a hydroxyl value of approximately 123 mgKOH/g.

Further, the resultant CME Polyol includes a component having the following Molecular Structure 1:

Molecular Structure 1

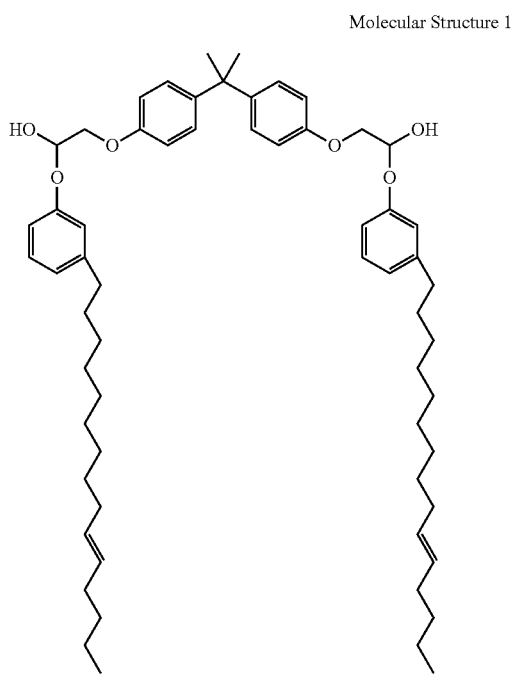 [SMILES: CCCC/C=C/CCCCCCCCCc1cccc(OC(O)COc2ccc(C(C)(C)c3ccc(OCC(O)Oc4cccc(CCCCCCCCC/C=C/CCCC)c4)cc3)cc2)c1]

Formation of Prepolymer Using CME Polyol (Working Example 1)

The following materials are used:

Isocyanate A A polycarbodiimide-modified diphenylmethane diisocyanate (modified MDI) having an NCO content of approximately 29 wt % (available from The Dow Chemical Company as ISONATE™ 143 L).

Diol A 1,4 butanediol chain extender (available from Sigma-Aldrich).

Catalyst A A catalyst that includes dibutyltin dilaurate (available from Air Products as Dabco® T-12).

A Prepolymer is prepared using the CME Polyol discussed above, according to the formulations shown in Table 1, below. To form the Prepolymer, the CME Polyol is reacted with an isocyanate (ISONATE™ 143 L) to synthesize polyurethane based prepolymers, which are derived from epoxy chemistry, having a target NCO content from 4 wt % to 5 wt % (i.e., isocyanate group content based on the total weight of the prepolymer component. The isocyanate index for the formation of the prepolymer is approximately 1.05.

TABLE 1

|  | Prepolymer (wt %) |
| --- | --- |
| CME Polyol | 62.37 |
| Diol | 4.03 |
| Catalyst A | 0.02 |
| Isocyanate A | 33.58 |
| NCO Content (wt %) | 4.6 |

The Prepolymer is prepared by adding the appropriate amount of the Isocyanate A into a 1000 mL four-necked flask equipped with condenser, thermometer, mechanical stirrer, and dropping funnel The flask is thoroughly purged and protected with nitrogen. Agitation is started at room temperature (approximately 25° C.). The CME polyol and the diol are mixed to form a polymer mixture prior to mixing with the isocyanate (the polyol mixture is dried with toluene reflux under DEAN STARK equipment before use). Then polyol mixture is then added dropwise into the isocyanate, together with the temperature slowly increasing toward 60° C. After the total system temperature is stable, the temperature is raised to 70° C. for 2 hours. The resultant prepolymer is then titrated to check the NCO content. The Prepolymer may be used in a one-component system or a two-component system.

Formation of Two Component System Using CME Polyol (Working Example 2)

The following materials are used:

Polyol A A hydrophobic polyol, having a functionality of approximately 2, an OH number of approximately 56 mg KOH/g, a number average molecular weight of approximately 2000 g/mol, and a viscosity of 480 cP at 25° C. (available from The Dow Chemical Company as VORAPEL™ D-3201).

Curing Agent A curing agent including dimethylthiotoluenediamine (available from Albemarle Corporation as ETHACURE® 300).

Catalyst B A bismuth based polymerization catalyst (available from Shepherd as BiCAT® 8).

Catalyst C A zinc based polymerization catalyst (available from Shepherd as BiCAT® Z).

Benzoyl Chloride A neutralizing agent (available from Sinopharm Chemical Reagent Co., Ltd).

Isocyanate B A diphenylmethane diisocyanate (MDI) (available from The Dow Chemical Company as ISONATE™ 50 OP).

A two-component formulation is prepared using a first component and a second component as shown in Table 2, below. The weight percentages in Table 2 are based on the total weight of the corresponding first component or second component.

TABLE 2

| First Component | (wt %)* | Second Component | (wt %)† |
| --- | --- | --- | --- |
| Polyol A | 43.0 | CME Polyol | 44.0 |
| Isocyanate B | 57.0 | Polyol A | 27.6 |
| Benzoyl Chloride | <0.01 | Curing Agent | 27.6 |
| — | — | Catalyst B | 0.6 |
| — | — | Catalyst C | 0.2 |

*Based on the total weight of the First Component
†Based on the total weight of the Second Component The First Component is prepared using a three neck round bottom flask to which the Isocyanate B is added followed by 1 drop of benzoyl chloride while purging is performed with dry nitrogen. Next, the Polyol A is added to the three neck round bottom flask and the reactive mixture is stirred using an overhead stirrer at 300 rpm. The mixture is slowly heated to a temperature of 80° C. over the course of 30 minutes and maintained at that temperature for 3 hours. The First Component is a prepolymer having an NCO content of 15 wt %.

The Second Component is prepared by mixing the CME Polyol, Polyol A, Curing Agent, and Catalysts B and C. These components are mixed for 1 minute in a FlackTek SpeedMixer™ to seek homogeneity.

Preparation and Examination of Plaques

Plaques are prepared using the Working Examples 1 and 2 discussed above, and using the Comparative Formulations A and B discussed below.

The following materials are used:

Comparative Formulation A A two-component system having a 1:1 volume ratio of VORASTAR® 6490 (a Jeffamine based aromatic polyurea available from The Dow Chemical Company) and VORASTAR® 6582 (a MDI based prepolymer available from The Dow Chemical Company).

Comparative Formulation B A two-component system having a 1:1 volume ratio of VORASTAR® 6320 (a polybutadiene based aromatic polyurea available from The Dow Chemical Company) and VORASTAR® 6651 (a MDI based prepolymer available from The Dow Chemical Company).

Working Example 1 is a one-component system using the Prepolymer. Working Example 2 is a two-component system, in which the pre-mixed Second Component is added to the First Component. Then, the First and Second Components are rapidly mixed (for 10 seconds) using the FlackTek SpeedMixer™. For both Working Examples 1 and 2, elastomer sheets are prepared using an Isotherm PM (or another suitable plural component high pressure spray equipment may be used). Materials are dispensed at a static pressure of 2000 psi using a Graco Fusion gun (or a Probler AP-2 polyurea spray gun may be used). Samples are sprayed onto a low energy polyethylene surface and sheets may be peeled off within 20-30 minutes of spraying.

For Comparative Formulation A, VORASTAR® 6490 is added to the VORASTAR® 6582. Then, the components are rapidly mixed (for 10 seconds) using the FlackTek SpeedMixer™. For Comparative Formulation B, VORASTAR® 6320 is added to the VORASTAR® 6651. Then, the components are rapidly mixed (for 10 seconds) using the FlackTek SpeedMixer™. For both Comparative Formulations A and B, elastomer sheets are prepared using an Isotherm PM (or another suitable plural component high pressure spray equipment may be used). Materials are dispensed at a static pressure of 2000 psi using a Graco Fusion gun (or a Probler AP-2 polyurea spray gun may be used). Samples are sprayed onto a low energy polyethylene surface and sheets may be peeled off within 20-30 minutes of spraying.

Next, chemical exposure tests are performed by having the plaques for each of Working Examples 1 and 2 and Comparative Examples A and B immersed in a water based solution including 37 wt % of HCl. The solution is maintained at a temperature of 25° C. for a period of seven days, with the plaques submersed within the solution. In particular, the chemical exposure tests are performed by immersing 2×2 inch coupons of each material in the indicated medium for a period of seven days. After the exposure period, the immersed samples are rinsed with DI water, patted dry with a paper towel, and stored in Ziploc bags for further testing. For the testing, replicated "dog bones" are cut from each square sample. Tensile strength and percent elongation at break are determined according to ASTM D-1708.

TABLE 3

|  | Working Example 1 | Working Example 2 | Comparative Example A | Comparative Example B |
|---|---|---|---|---|
| Initial tensile strength (psi) | 835 | 4519 | 2020 | 1410 |
| Initial percent elongation at break (%) | 124 | 80 | 221 | 97 |
| Tensile strength after submersion for 7 days (psi) | 1404 | 6005 | 5 | 335 |
| Percent elongation after submersion for 7 days (%) | 124 | 10 | 5 | 18 |
| Retention in tensile strength after submersion (%) | 168.1 | 132.9 | 0.2 | 23.8 |
| Retention in percent elongation after submersion (%) | 100.0 | 12.5 | 2.3 | 18.6 |
| Percent change in mass after submersion (%) | 9.5 | N/A | 100.0 | 10.0 |

With respect to Table 3, above, tensile and percent elongation are measure according to ASTM D-1708. The retention of tensile strength and percent elongation are calculated based on the following equations for percentage change in tensile strength:

Percent change in tensile strength=100−[(Initial Tensile Strength−Final Tensile Strength)/(Initial Tensile Strength)]*100    Equation (A):

whereas, Initial Tensile Strength minus Final Tensile Strength is an absolute value.

Percent change in elongation=100−[(Initial Elongation−Final Elongation)/(Initial Elongation)]*100    Equation (B):

whereas, Initial Elongation minus Final Elongation is an absolute value.

Retention is calculated as 100+Percent change (in tensile strength or elongation), when an increase is observed. Further, retention is calculated as 100−Percent change (in tensile strength or elongation), when a decrease is observed.

The invention claimed is:

1. A sprayable polyurethane coating, comprising the reaction product of an isocyanate component and an isocyanate-reactive component, wherein:

the isocyanate component includes an isocyanate, and
the isocyanate-reactive component includes a cardanol-modified epoxy polyol, the cardanol-modified epoxy polyol being a reaction product of an epoxy component and an epoxy-reactive component at a ratio of epoxy groups to epoxy reactive groups from 1:0.95 to 1:5, the cardanol-modified epoxy polyol having an epoxide equivalent weight of at least 8,000 g/eq, and the epoxy-reactive component including a cardanol component.

2. The sprayable polyurethane coating as claimed in claim 1, wherein the cardanol component has a cardanol content of at least 50 wt %, based on a total weight of the cardanol component.

3. The sprayable polyurethane coating as claimed in claim 2, wherein the cardanol component is cashew nutshell liquid.

4. The sprayable polyurethane coating as claimed in claim 1, wherein the reaction product of the isocyanate component and the isocyanate-reactive component is an isocyanate-terminated prepolymer having an isocyanate moiety content from 2 wt % to 23 wt %.

5. The sprayable polyurethane coating as claimed in claim 1, wherein the isocyanate component includes an isocyanate-terminated prepolymer that is the reaction product of at least one polyisocyanate and at least one hydrophobic polyol.

6. A sprayable polyurethane based reaction system for forming a protective coating in industrial containers comprising the reaction system as claimed in claim 1.

7. The sprayable polyurethane coating as claimed in claim 1, wherein the epoxide equivalent weight is from 20,000 g/eq to 100,000 g/eq.

8. The sprayable polyurethane coating as claimed in claim 1, wherein the isocyanate component and the isocyanate reactive component are sprayed on a surface to form the sprayable polyurethane coating.

9. The sprayable polyurethane coating as claimed in claim 8, wherein the surface is a large industrial container.

10. A process for forming the sprayable polyurethane coating as claimed in claim 1, comprising:
  preparing a polyurethane resin system by reacting the isocyanate component and the isocyanate-reactive component, and
  spraying the polyurethane resin system as a coating on a surface.

11. A process for preparing the sprayable polyurethane coating as claimed in claim 1, comprising:
  (A)
    preparing a polyurethane resin system by mixing the isocyanate component and the isocyanate-reactive component, and
  (A) curing the polyurethane resin system.

* * * * *